R. H. CONWAY & H. E. BISBING.
RAIL JOINT.
APPLICATION FILED MAY 3, 1909.
947,173.
Patented Jan. 18, 1910.
2 SHEETS—SHEET 1.
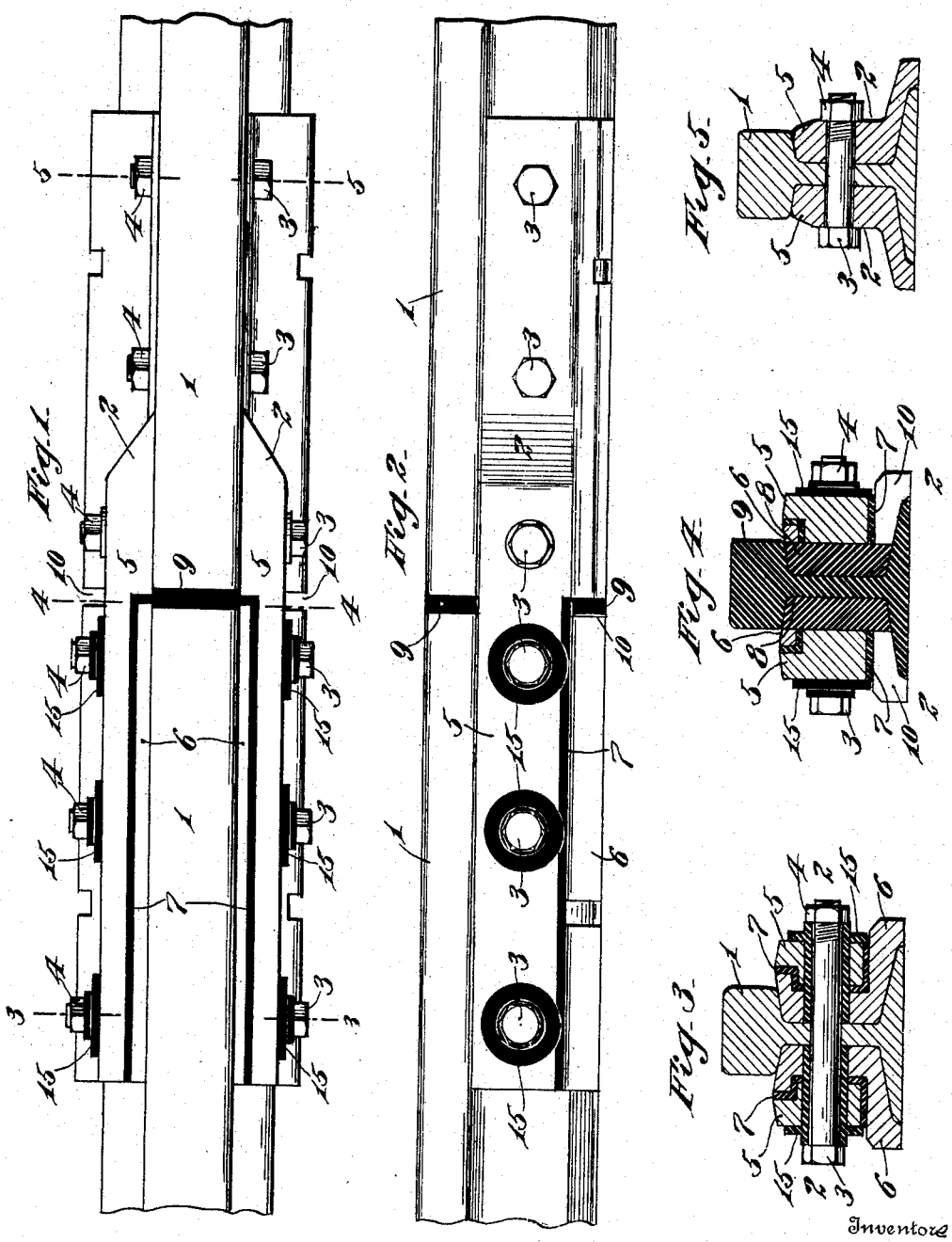
Witnesses
Theo. Riemann.
J. T. F. Mulhall.
Inventors
Richard H. Conway
Harry E. Bisbing,
By Joshua R. H. Potts
Attorney

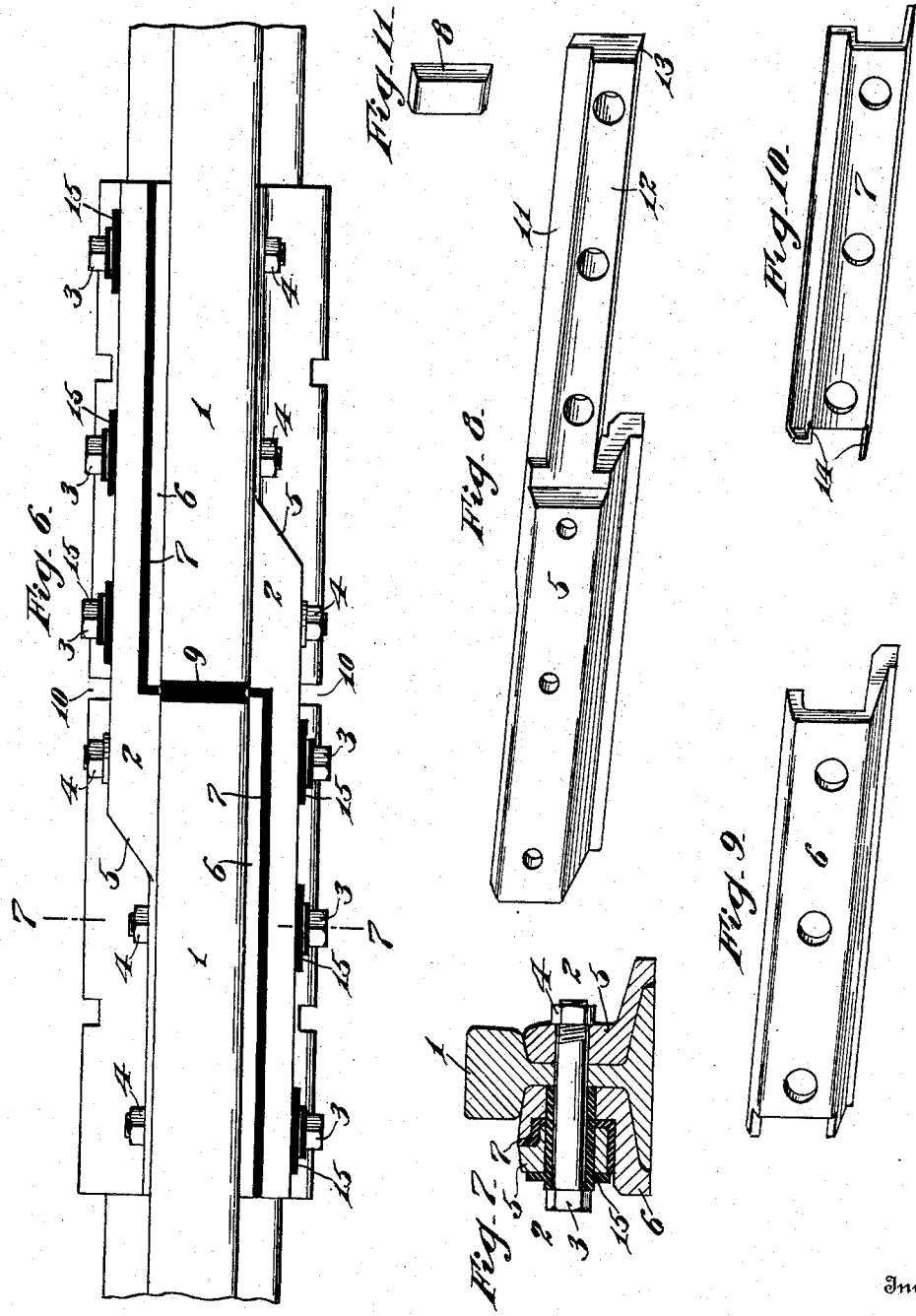

UNITED STATES PATENT OFFICE.

RICHARD H. CONWAY AND HARRY E. BISBING, OF PHILADELPHIA, PENNSYLVANIA, ASSIGNORS OF ONE-FOURTH TO LEWIS K. MARR, OF PHILADELPHIA, PENNSYLVANIA.

RAIL-JOINT.

947,173.  Specification of Letters Patent.  Patented Jan. 18, 1910.

Application filed May 3, 1909. Serial No. 493,463.

*To all whom it may concern:*

Be it known that we, RICHARD H. CONWAY and HARRY E. BISBING, residing at Philadelphia, in the county of Philadelphia and State of Pennsylvania, have invented certain new and useful Improvements in Rail-Joints, of which the following is a specification.

Our invention relates to an improved rail joint, and more particularly to an insulating joint, the object of the invention being to provide improvements of this character, which will firmly and rigidly secure the meeting ends of rails in alinement, and which will most effectually insulate one rail from the other.

A further object is to provide an improved insulated rail joint composed entirely of metal and fiber insulation, which will enable the insulation to be readily replaced in case of wear, and the substitution of a new part for any broken or injured part of the joint.

With these and other objects in view, the invention consists in certain novel features of construction, and combinations and arrangements of parts as will be more fully hereinafter described and pointed out in the claims.

In the accompanying drawings, Figure 1, is a plan view illustrating one form of our improvements. Fig. 2, is a view in side elevation of Fig. 1. Fig. 3, is a view in cross section on the line 3—3 of Fig. 1. Fig. 4, is a view in cross section on the line 4—4 of Fig. 1. Fig. 5, is a view in cross section on the line 5—5 of Fig. 1. Fig. 6, is a plan view illustrating a modified form of rail joint. Fig. 7, is a view in cross section on the line 7—7 of Fig. 6. Figs. 8, 9, 10 and 11, are detail perspective views of the several parts forming one side of a rail joint.

1, 1, represent rails secured in alinement by our improved rail joint members 2, 2, located at opposite sides of the rail, and secured by means of bolts 3 and nuts 4. Each member 2 comprises four separate and distinct parts, which for convenience of description, have been designated 5, 6, 7 and 8, the parts 5 and 6 being of metal, preferably steel, and the parts 7 and 8 of insulating fibrous composition.

Between the adjacent ends of the rails 1, 1, a plate 9 of fibrous insulating material is positioned, and conforms in shape to the shape of the rails. The part 5 of both members being notched as shown at 10, so that the lower portion of this insulating plate 9 can be readily observed from the outside, so that it can be replaced in the event it has become worn.

The part 5 which extends throughout the entire length of the joint, is of the peculiar shape shown most clearly in Fig. 8, which throughout about one-half of its length on its inner face, is provided with a longitudinal groove 11, and the part 7 which is of insulating fiber, is so shaped in cross section as to conform to the shape of the recess 11, the inner face 12, and the bottom face 13 of this end of part 5.

The end of the part 7 adjacent to the center of part 5, is cut away as shown at 14, and the block 8 of insulating material is located in this cut out portion of the insulation 7, and lies within a recess formed by the coöperation of the recessed ends of parts 5 and 6 when together, and is held tight against the rail ends and against the insulating plate 9.

The part 6 conforms in general outline to the shape of part 7, and incloses the latter, except at the upper and outer edges and at the end of the joint, where the edge of the insulation 7 can be seen.

The parts 5, 6 and 7, are provided with alined openings registering with openings in the rails, and insulating sleeves 15 are positioned in the said openings to receive the ordinary bolts 3 and nuts 4 to securely tie the rails together.

As will be seen in Fig. 1, one end of each joint member is narrowed or restricted, as it is only necessary to widen the member where the three parts 5, 6 and 7 are formed. In Figs. 1, 2, 3, 4 and 5, the wide sections of both rail joint members are at the same end, while the structure shown in Figs. 6 and 7, illustrates the opposite ends of the rail joint members widened, but in either event, the insulation will be perfect, and the rails will be absolutely insulated one from the other. It will also be observed that the insulating piece 7 is protected from the weather to a great extent, and hence its life will be correspondingly lengthened, for when the members are clamped by means of the bolts against the rails, the insulation will be so tightly clamped against members 5 and 6, that it will be practically impossible for any moisture to find its way into the fibrous insulation.

The plate 9 between the ends of the rails is preferably made of about twice the thickness of the part 7. This is not only that the life of the plate 9 between the vibrating rails will be lengthened, but so that regardless of a wide range of movement of the joint members during expansion and contraction of the parts, the insulation of the rails one from the other will be thoroughly maintained. The parts of each member are so shaped that they interlock without the employment of any device to hold them, other than the ordinary bolts such as used in all rail joints, and they may be taken apart and replaced by new parts whenever desired by any one of average intelligence at comparatively small cost.

Slight changes might be made in the general form and arrangement of parts described without departing from our invention, and hence we do not restrict ourselves to the precise details set forth, but consider ourselves at liberty to make such changes and alterations as fairly fall within the spirit and scope of the claims.

Having thus described our invention what we claim as new and desire to secure by Letters Patent is:

1. In a rail joint, the combination with the adjacent ends of two rails, of a plate of insulating material interposed between the ends of the rails, a rail joint member located at each side of the rails, each rail joint member comprising a part extending throughout the length of the joint, and having a recessed end, an insulating part conforming in shape to the shape of said recessed portion of the first mentioned part, a third part conforming in general shape to the shape of said insulation, and a block of insulation adjacent the insulating plate and against the said insulating part.

2. In a rail joint, the combination with the adjacent ends of two rails, of a plate of insulating material interposed between the adjacent ends of the rails, and conforming in shape to the shape of the rails, joint members at opposite sides of the rail, each member comprising a part extending throughout the length of the joint and recessed at one end, an insulating part conforming in shape to the recessed end of the first mentioned part, a third part conforming in shape to the shape of the insulation and confining the insulation between the same and the first mentioned part, a block of insulation located against the plate between the ends of the rails and bearing against the insulating part, said parts having alined openings registering with openings in the rails, insulating sleeves extending through the said parts and clamping bolts projecting through said sleeves and said rails.

3. In a rail joint, the combination with the adjacent ends of two rails, of a plate of insulating material interposed between the ends of said rails, joint members at opposite sides of said rails, each member comprising two sections and an interposed thickness of insulating material extending from one end to a point opposite the said plate, blocks of insulating material interposed between said last mentioned insulating material and said plate, said members having alined openings, insulating sleeves in said openings, and bolts passing through said sleeves and tying the rails together.

4. In a rail joint, the combination with the adjacent ends of two rails, of a plate of insulating material interposed between the ends of said rails, joint members at opposite sides of said rails, each member comprising two sections and an interposed thickness of insulating material extending from one end to a point opposite the said plate, blocks of insulating material interposed between said first mentioned insulating material and said plate, said members having alined openings, insulating sleeves in said openings, and bolts passing through said sleeves and tying the rails together, and both of said members having notches or recesses registering with the plate of insulating material, substantially as and for the purpose set forth.

In testimony whereof we have signed our names to this specification in the presence of two subscribing witnesses.

R. H. CONWAY.
HARRY E. BISBING.

Witnesses:
R. H. KRENKEL,
J. A. L. MULHALL.